(12) United States Patent
Oba et al.

(10) Patent No.: US 8,908,540 B2
(45) Date of Patent: Dec. 9, 2014

(54) EFFICIENT AND LOSS TOLERANT METHOD AND MECHANISM FOR MEASURING AVAILABLE BANDWIDTH

(75) Inventors: Yoshihiro Oba, Englewood Cliffs, NJ (US); Yuu-Heng Alice Cheng, Piscataway, NJ (US); Victor Fajardo, Robbinsville, NJ (US)

(73) Assignees: Toshiba America Research, Inc., Washington, DC (US); Telcordia Technologies, Inc., Piscataway, NJ (US)

( * ) Notice: Subject to any disclaimer, the term of this patent is extended or adjusted under 35 U.S.C. 154(b) by 1139 days.

(21) Appl. No.: 12/371,286

(22) Filed: Feb. 13, 2009

(65) Prior Publication Data

US 2010/0208613 A1 Aug. 19, 2010

(51) Int. Cl.
H04L 12/26 (2006.01)
(52) U.S. Cl.
USPC .......................................... 370/252
(58) Field of Classification Search
None
See application file for complete search history.

(56) References Cited

U.S. PATENT DOCUMENTS

| | | | |
|---|---|---|---|
| 6,798,741 B2 | 9/2004 | Lodha et al. | |
| 7,200,673 B1 * | 4/2007 | Augart | 709/238 |
| 2003/0152028 A1 * | 8/2003 | Raisanen et al. | 370/235 |
| 2003/0152034 A1 * | 8/2003 | Zhang et al. | 370/252 |
| 2004/0133625 A1 | 7/2004 | Plessmann | |
| 2005/0071876 A1 | 3/2005 | van Beek | |
| 2006/0182039 A1 * | 8/2006 | Jourdain et al. | 370/252 |
| 2006/0209701 A1 | 9/2006 | Zhang et al. | |
| 2006/0215574 A1 * | 9/2006 | Padmanabhan et al. | 370/252 |
| 2008/0219287 A1 * | 9/2008 | Krueger et al. | 370/458 |
| 2009/0016240 A1 * | 1/2009 | Sebastian | 370/253 |
| 2011/0264822 A1 * | 10/2011 | Ferguson et al. | 709/235 |

FOREIGN PATENT DOCUMENTS

| | | |
|---|---|---|
| CN | 1488214 A | 4/2004 |
| CN | 1488214 A | 4/2004 |
| CN | 1618024 A | 5/2005 |
| JP | 2004-524782 A | 8/2004 |
| JP | 2005-110267 A | 4/2005 |
| WO | 02/087276 A2 | 10/2002 |

OTHER PUBLICATIONS

Hu et al. Estimating Available Bandwidth Using Packet Pair Probing. Defense Advanced Research Project Agency F30602-99-1-0518 and Carnegie Melon University CMU-CS-02-166, Sep. 9, 2002, Retrieved from the Internet: <URL:http://www.cs.cmu.edu/~hnn/papers/igi-tr.pdf> pp. 1-27.*

Ningning Hu et al. "Estimating Available Bandwidth Using Packet Pair Probing." Defense Advanced Research Project Agency F30602-99-1-0518 and Carnegie Melon University CMS-CS-02-166, Sep. 9, 2002, (Retrieved on Mar. 31, 2010). Retrieved from the Internet: <URL:http://www.cs.cmu.edu/-hnn/papers/igi-tr.pdf>pp. 1-27.

(Continued)

*Primary Examiner* — Mohammad Adhami
(74) *Attorney, Agent, or Firm* — Westerman, Hattori, Daniels & Adrian, LLP (57) ABSTRACT

A single burst method is used to determine the available bandwidth in a network environment. A sending node transmits test packets to a receiving node. The size of the test packets is dynamically determining based on network parameters within the network environment. The sending node then receives test receipt packets that have the same sequence numbers as the corresponding test packets. Packet clusters are formed from the test receipt packets. The available bandwidth is determined based on the packet clusters along with values set by the single burst method or inputted by a user.

26 Claims, 9 Drawing Sheets

(56) References Cited

OTHER PUBLICATIONS

International Search Report and Written Opinion of PCT/US2010/024313, mailing dated Apr. 19, 2010.
Japanese Office Action dated Dec. 18, 2012, issued in corresponding Japanese patent application No. 2011-550312, w/ English translation.
Chinese Office Action and Search Report of Apr. 28, 2013 and May 9, 2013, issued in corresponding Chinese Patent Application No. 201080007339.4, w/ English translation of Office Action and standard English Codes in Search Report.
English translation of Chinese Search Report (translation received Jul. 2013), Search Report was issued in corresponding application No. 2010800073394 in China (see prior IDS containing Search Report).
Japanese Office Action in corresponding Japanese application No. 2011-550312 issued Jun. 4, 2013.
Chinese Office Action dated Aug. 5, 2014, issued in corresponding Chinese application No. 2010800073394, w/English translation.

* cited by examiner

EFFICIENT AND LOSS TOLERANT METHOD AND MECHANISM FOR MEASURING AVAILABLE BANDWIDTH

FIELD OF THE INVENTION

The present invention relates to determining the bandwidth within a network. More particularly, the present invention relates to determining the bandwidth using any device that includes one or more network interfaces.

DISCUSSION OF THE RELATED ART

A criterion for measuring the performance of a network may be its bandwidth. Within a network, bandwidth usually is defined as the amount of data that can be carried from one point to another in a given time period, such as a second. Bandwidth may be expressed in bits per second, (bps), or bytes per second (Bps). A link with a high bandwidth, for example, may be able to carry enough information to sustain the succession of images in a video presentation.

The unused capacity, or available bandwidth, may indicate the performance of a network. In particular, knowledge on the available bandwidth of a path in a network may help a host choose a suitable network to use among a plurality of candidate networks available in a given location.

Several methods may be known to measure available bandwidth. These methods, however, may have the following shortcomings. For example, one issue may be the latency of the measurement. Available bandwidth measurements methods that use transmission control protocol (TCP) exhibit a high measurement latency, such as more than 10 seconds, due to the "slowstart" flow control behavior of TCP. Another reason that existing available bandwidth measurement methods have high measurement latency is because the methods measure the available bandwidth as accurate as possible. The methods do not focus on reducing the measurement latency or the amount of data to transmit.

For example, an Iperf (a TCP/UDP bandwidth measurement tool) test continues until a predetermined time period elapses or until the amount of transmitted octets reaches a predetermined value. The tests occur even if a sufficient level of measurement accuracy can be achieved by a shorter period of time or less amount of data to transmit. The determination, however, of more optimized parameter values requires a tune-up process. Iperf does not have a tune-up process. PathChirp (a UDP bandwidth measurement tool) has a tune-up process which requires several test iterations to adjust the inter-transmission intervals of test packets. This results in higher measurement latency and longer test periods.

Another issue is that some available bandwidth measurement methods require input parameters from users to improve measurement accuracy, or to reduce latency or the amount of data required for a measurement. For example, the tune-up process in PathChirp described above may desire a lower bound and an upper bound for the measured available bandwidth as well as the packet size as input parameters. The Iperf tool mentioned above allows the measurement period or the number of octets to be transmitted, while the maximum transmission rate and packet size are specified by the user. When these parameters are not specified by the user, pre-configured default values may be used. Pre-configured default values, however, may result in reduced measurement accuracy, increased measurement latency or amount of data to transmit.

Another issue is the fact that no available bandwidth measurement method is available that is robust against packet loss. The TCP-based methods may be robust against packet loss, but they basically measure the throughput of the TCP-based applications. The TCP-based methods, however, do not measure the available bandwidth that is larger than the throughput due to window flow control of TCP.

Thus, known methods and processes are not able to measure or provide timely bandwidth information for a network. As discussed above, these methods and processes include a measurement latency or the need for user input.

SUMMARY OF THE INVENTION

To overcome the issues discussed above, the disclosed embodiments provide a new available bandwidth method referred to as the single burst method. The single burst method of the disclosed embodiments reduces the measurement latency and the amount of data to transmit without the need of input parameters from a user. The single burst method of the disclosed embodiments also is designed to be robust against packet loss.

The amount of test packets is dynamically determined using an algorithm designed to be robust against packet loss. The disclosed embodiments use packet clusters to avoid counting lost packets in computations. Packet clusters exclude the time period between lost packets.

Thus, the disclosed embodiments recite method for determining available bandwidth in a network environment. The method includes transmitting a plurality of test packets. Each test packet includes a sequence number. The method also includes receiving a plurality of test receipt packets corresponding to the plurality of test packets. Each test receipt packet includes the sequence number of the corresponding test packet. The method also includes forming at least one packet cluster from the plurality of successfully delivered test packets. The method also includes determining an available bandwidth based on the at least one packet cluster and an inter-arrival time between a first test packet and a last test packet in the at least one cluster.

According to the disclosed embodiments, a method for determining available bandwidth in a network without a need for user input is recited. The method includes dynamically determining an amount of test packets to transmit from a sending node. Each test packet includes a sequence number. The method also includes sending the amount of test packets to a receiving node. The method also includes receiving an amount of test receipt packets corresponding to the test packets from the receiving node. Each test receipt packet includes the sequence number of its corresponding test packet. The method also includes optionally setting a value for test packet size or transmission rate based on at least one network parameter. The method also includes determining an available bandwidth between the sending node and the receiving node with a single burst algorithm using at least one packet cluster comprised of the amount of test receipt packets and the value.

Further according to the disclosed embodiments, a single burst method for determining available bandwidth in a network environment is recited. The single burst method includes sending a test packet having a sequence number from a sending node to a receiving node. The single burst method also includes receiving a test receipt packet having the sequence number at the sending node. The single burst method also includes placing at least two delivered test packets in a packet cluster such that the sequence numbers of the delivered test packets are continuous. The single burst method also includes determining an available bandwidth between the sending node and the receiving node using the packet cluster in a single burst algorithm.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed in the claims.

DETAILED DESCRIPTION OF THE PREFERRED EMBODIMENTS

Reference will now be made in detail to the preferred embodiments of the present invention. Examples of the preferred embodiments are illustrated in the accompanying drawings.

Figure 1:
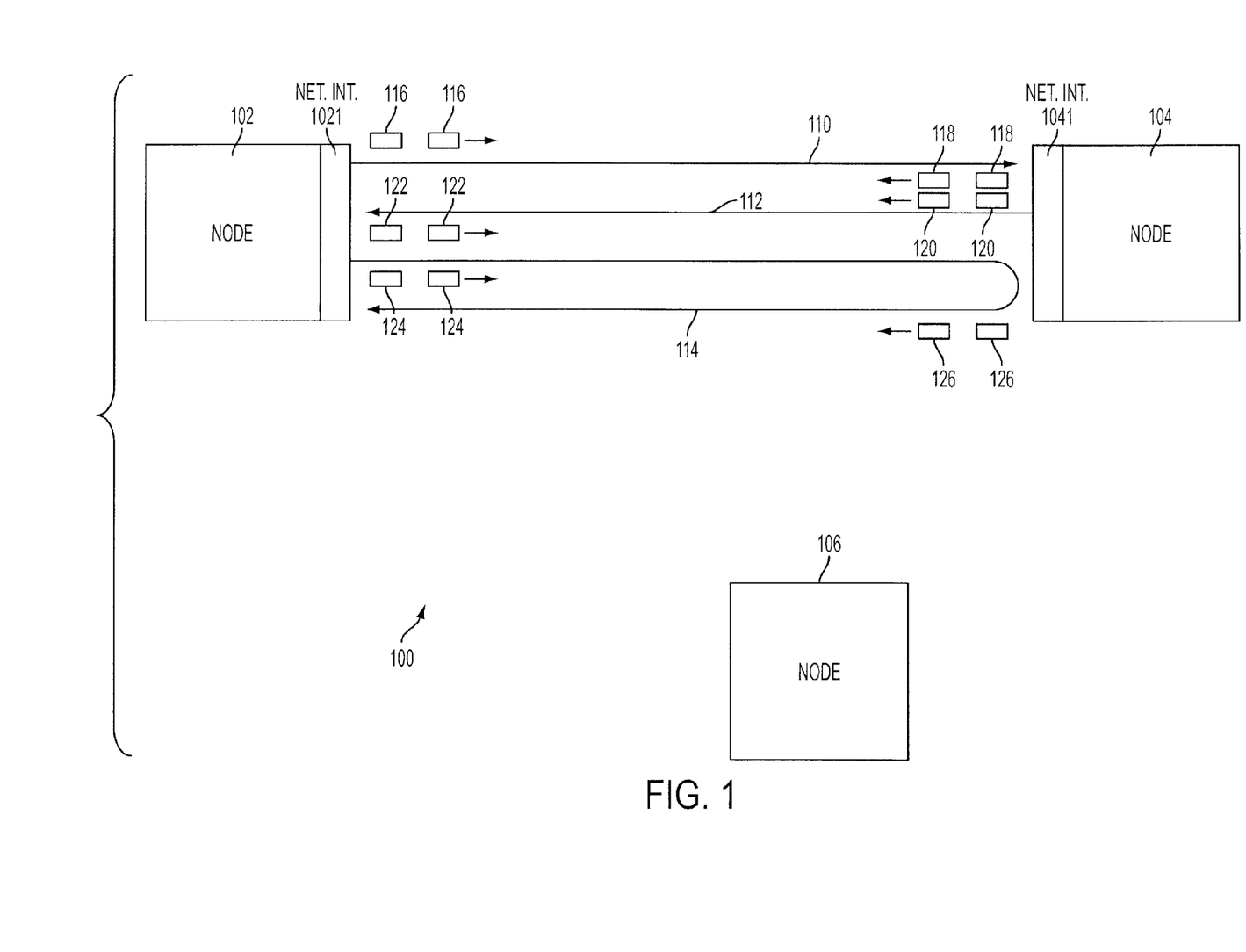
FIG. 1 illustrates a network environment having nodes according to the disclosed embodiments.

FIG. 1 depicts a network environment 100 having nodes 102, 104 and 106. Network environment 100 is referred to as an "environment" because the nodes may be located in more than one network. Thus, more than one network may be available in network environment 100.

Node 102 may be a source node in that it plays an active role for initiation of an available bandwidth test along a path in network environment 100. Node 104 may be a target node in that it plays a passive role for initiation of an available bandwidth test according to the disclosed embodiments. Node 102 includes a network interface 1021 that transmits packets at a transmission rate. Node 104 includes a network interface 1041 that transmits packets at a transmission rate.

Forward path 110 is a path from source node 102 to target node 104. Backward path 112 is a path from target node 104 to source node 102. Roundtrip path 114 is a concatenation of forward path 110 and backward path 112 that originates and terminates at source node 102.

Node 106 also may use the above-disclosed path designations to nodes 102 and 104. In fact, the terms "source node" and "target node" are used simply for reference, and any of node within network environment 100 may serve as a source node or a target node to measure available bandwidth.

According to the disclosed embodiments, directional available bandwidth may refer to the available bandwidth of either forward path 110 or backward path 112. In determining the directional available bandwidth, the terms maximum transmission unit (MTU) and round-trip time (RTT) also may be used.

Figure 2:
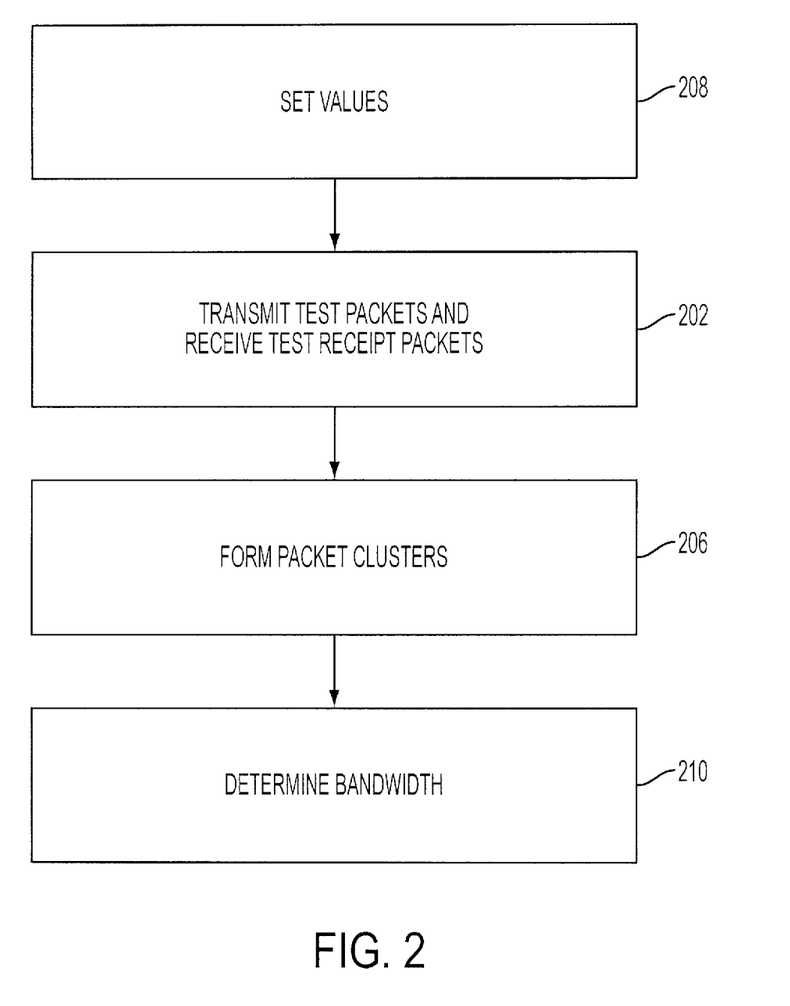
FIG. 2 illustrates a flowchart for implementing the single burst method to determine available bandwidth according to the disclosed embodiments.

FIG. 2 depicts a flowchart for implementing the single burst method to determine available bandwidth according to the disclosed embodiments. The single burst algorithm, or method, may measure roundtrip available bandwidth, forward path available bandwidth and the backward path available bandwidth. Step 202 executes by transmitting test packets from a sending node to a receiving node and receiving test receipt packets at the sending node. These steps are disclosed in greater detail below.

Referring back to FIG. 1, when determining forward path available bandwidth, source node 102 transmits one or more test packets 116 of size L (octets) that include an internet protocol (IP) header to target node 104 at a transmission rate $R_t$ (bps). Source node 102 then waits for test receipt packets 118 from target node 104.

For the backward path available bandwidth, target node 104 transmits one or more test packets 120 to source node 102. Target node 104 then waits for test receipt packets 122 from source node 102. The forward and backward available bandwidth analysis may be known as directional available bandwidth tests. The roundtrip path available bandwidth test may use test packets 124 and test receipt packets 126.

The test and the corresponding test receipt packets are identified by the sequence number carried in each packet. The sender and receiver of the test packets as well as the entity that computes the available bandwidth are determined depending on the type of test performed, as disclosed below.

In the case of a roundtrip path available bandwidth test, test receipt packets 126 may include the same amount of payload as test packets 124 to load the bottleneck links in both the forward and backward paths. In the case of a directional available bandwidth test, the test receipt packets do not include a payload to load the bottleneck link.

The number of transmitted octets in test packets has a lower bound and an upper bound that are denoted as $N_{min}$ and $N_{max}$, respectively. While performing the operations of the disclosed embodiments, source node 102, as a sender, transmits at least $N_{min}$ octets of test packets and stops transmission when a test receipt packet is received after transmitting $N_{min}$ octets or transmitting $N_{max}$ octets. Thus, the amount of test packets to transmit is dynamically determined based on the round-trip time, or RTT, and the available bandwidth. Further, the measurement latency depends on the RTT, the available bandwidth, and the transmission rate.

Referring back to FIG. 2, step 206 executes by forming packet clusters based on the test packets and test receipt packets. According to the disclosed embodiments, a packet cluster is defined as a set of delivery times of at least two test packets having sequence numbers that are continuous.

For the roundtrip path available bandwidth test, a test packet is considered as delivered when the corresponding test receipt packet is received by source node 102. For the forward path available bandwidth test, a test packet is considered as delivered when the test packet is received by target node 104. For the backward path available bandwidth tests, a test packet is considered as delivered when the test packet is received by source node 102.

Packet clusters may be arranged in ascending order of smallest sequence number in each cluster. $P_i$ may denote a test packet having a sequence number of i and $c_k$ may denote the k-th packet cluster. If test packets $p_1, p_3, p_2, p_5, p_6, p_8, p_{10}$, and $p_{11}$ are received in the listed order, then the packet clusters would be $c_1=[p_1, p_3, p_2]$, $c_2=[p_5, p_6]$, and $c_3=[p_{10}, p_{11}]$. Packet $p_8$ does not form a packet cluster.

The disclosed embodiments disclose an algorithm to form a list of packet clusters from an array of test packet delivery times as compiled in steps 202 and 204. The complexity of the algorithm may be related to the number of test packets that do not require re-ordering of the test packets. For the roundtrip path and backward path available bandwidth tests, the packet cluster algorithm is executed by source node 102. For the forward path available bandwidth test, the packet cluster algorithm is executed by target node 104.

Let a[ ] denote an array of integers where a[i] stores the delivery times of (i−1)-th test packet, and where i denotes the index of the array. A delivery time of zero in the array indicates that the corresponding test packet was not delivered. The test receipt packets are considered as test packets for a roundtrip available bandwidth test. The size of the array is bounded by the maximum sequence number minus one.

The term last denotes the sequence number of the last test packet. The term add_cluster(int min_a, int max_a, int n) may be a procedure that creates a new packet cluster for which the minimum delivery time, the maximum delivery time and the number of packets in the cluster is given by min_a, max_a and n, respectively. The terms min(x,y) and max(x,y) may represent a function that returns the minimum and maximum value between x and y, respectively.

A packet cluster algorithm is invoked once the transmission of test packets and the receiving of test receipt packets are completed. In one embodiment of the roundtrip path available bandwidth test, the transmission of test packets and the receiving of test receipt packets may be considered as completed when the last transmitted test packet has been delivered in step 204, i.e., when source node 102 receives the test receipt packet for the last transmitted test packet.

In another embodiment of the roundtrip path available bandwidth test, source node 102 transmits an explicit completion indication packet after transmitting the last test packet in step 202. The transmission of test packets and the receiving of test receipt packets may be considered as completed when source node 102 receives an explicit completion indication receipt packet from target node 104 in step 202.

In one embodiment of the forward path available bandwidth test, source node 102 transmits an explicit completion indication packet after transmitting the last test packet in step 202. The transmission of test packets and the receiving of test receipt packets may be considered as completed when target node 104 receives the explicit completion indication packet from source node 102 in step 202.

In one embodiment of the backward path available bandwidth test, target node 104 transmits an explicit completion indication packet after transmitting the last test packet in step 202. The transmission of test packets and the receiving of test receipt packets may be considered as completed when source node 102 receives an explicit completion indication packet from target node 104 in step 202.

Figure 3:
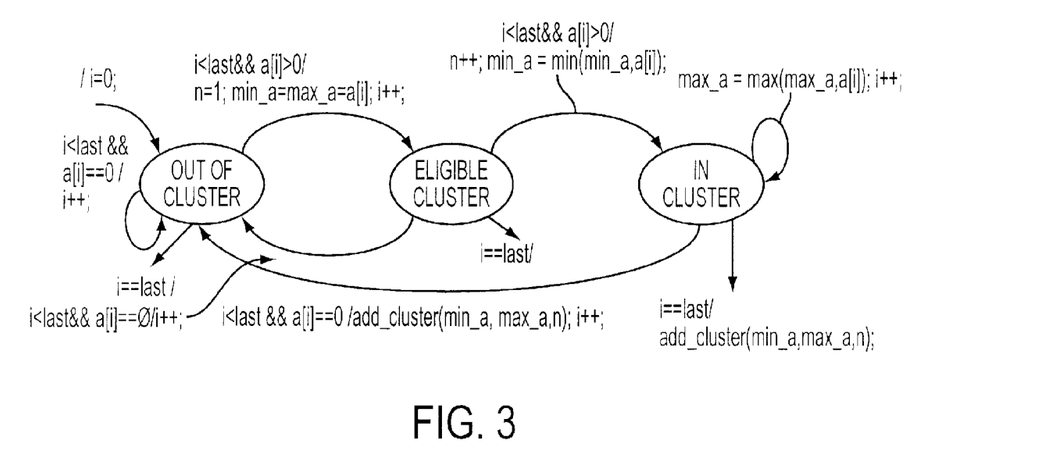
FIG. 3 illustrates a state machine for a packet cluster algorithm for forming packet clusters according to the disclosed embodiments.

The packet cluster algorithm follows the state machine depicted in FIG. 3. The state machine consists of three states: Out of Cluster, Eligible Cluster and In Cluster, where state Out of Cluster is the initial state. State Out of Cluster indicates that the test packet corresponding to a[i] was not delivered. State In Cluster indicates that the test packet corresponding to a[i] belongs to the current cluster. State Eligible Cluster indicates that the test packet corresponding to a[i] belongs to a new cluster if and only if the test packets corresponding to a[i] and a[i+1] were delivered, and the test packet corresponding to a[i−1] was not delivered.

In FIG. 3, each arrow represents a state transition where the states associated with the tail and head of the arrow represent the source and destination states, respectively. A state transition that has no source state indicates the initial state transition that starts the state machine. A state transition that has no destination state indicates a final state transition that ends the state machine. A label associated with each transition and separated by character '/' indicates a pair of condition and action, where the left-side text and right-side text of character '/' in the label indicate the condition and the action, respectively.

If the condition associated with the transition holds when the source state of the state transition is the current state, the action associated with the state transition is taken before entering the destination state. A state transition that has a null condition indicates that the state transition unconditionally happens. A state transition that has a null action indicates that no action is taken for the state transition.

The initial state transition to state Out of Cluster has action i=0;. A state transition from state Out of Cluster to state Eligible Cluster happens when i<last & &a[i]>0, and action n=1;min_a=max_a=a[i];i++; is taken in the transition. A state transition from state Out of Cluster to the same state happens when i<last and a[i]==O, and action i++; is taken in the transition. A final state transition from state Out of Cluster happens when i==last and no action is taken in the transition.

A state transition from state Eligible Cluster to state In Cluster happens when i<last & &a[i]>0, and action n++; min_a=min(min_a,a[i]);max_a=max(max_a,a[i]);i++;  is taken in the transition. A state transition from state Eligible Cluster to state Out of Cluster happens when i<last & &a[i]==0, and action i++; is taken in the transition. A final state transition from state Eligible Cluster happens when i==last and no action is taken in the transition.

A state transition from state In Cluster to the same state happens when i<last & &a[i]>0, and action n++;min_a=min (min_a,a[i]);max_a=max(max_a,a[i]);i++; is taken in the transition. A state transition from state In Cluster to state Out of Cluster happens when i<last & &a[i]==0, and action add_cluster(min_a,max_a,n);i++; is taken in the transition. A final state transition from state In Cluster happens when i==last and action add_cluster(min_a,max_a,n); is taken in the transition.

A delivered test packet is then moved from Out of Cluster to In Cluster based on the criteria disclosed above. A test packet may not be moved to a packet cluster, and dropped from the available bandwidth analysis. Thus, using the state machine shown in FIG. 3, packet clusters may be formed from the delivered test packets, as disclosed above.

Step 208 executes by setting values in order to perform the single burst method to determine available bandwidth. A user may set these values via an input or other interface. Inputs, however, may not be received and are not needed to set these values. In the disclosed embodiments, a pair of values is set, L and $R_t$. L, as disclosed above, may represent the size, in octets, of the test packets. $R_t$, as disclosed above, may represent the transmission rate in bits per second (bps).

If not specified by the user, L and $R_t$ may be determined as follows. If path MTU is known, then L is set to the path MTU. Otherwise, L is set to the minimum MTU. For example, L may be set to 576 octets for IPv4 networks and 1280 octets for IPv6 networks.

$R_t$ may be set to a value about or equal to the maximum speed of the outgoing interface of the test packets. As shown in FIG. 1, node 102 includes network interface 1021 and node 104 includes network interface 1041. In the case of a backward path available bandwidth test, $R_t$ may be specified by the source node as the maximum speed of the incoming interface of the source and communicated to the target node. Preferably, the target node, such as node 104, should have network interface 1041 at a maximum speed higher than that for network interface 1021 of source node 102.

Step 210 executes by determining the available bandwidth using the single burst method, or algorithm. The available bandwidth, according to the disclosed embodiments, may be determined using Equation 1 below.

$$B = \sum_{k=1}^{C} 8(m_k - 1)L \Big/ \sum_{k=1}^{C} D_k \quad \text{[Equation 1]}$$

where $m_k$ denotes the number of test packets in k-th packet cluster ($m_k \geq 2$), $D_k$ denotes the inter-delivery time in seconds between the first and last test packets in k-th packet cluster, and C denotes the total number of packet clusters.

Because test packets may not be delivered in order, the first delivered test packet of a cluster may not have the smallest sequence number in the cluster. Similarly, the last delivered test packet of a cluster may not have the largest sequence number in the cluster.

The single burst method and algorithm for each metric is disclosed in greater detail below. For simplicity, in all measurement algorithms, if a single burst test does not complete within a time period $D_{max}$ (seconds) ($D_{max}$ is greater than a largest possible RTT value in normally operated networks, such as 5 seconds) or the sequence number exceeds its maximum value, source node 102 and target node 104 may immediately delete their states and the test is considered as failure.

In addition, the sender of test packets stops transmission of test packets when the total number of transmitted octets reaches a threshold $N_{max}$ even before receiving the first test receipt packet. $N_{max}$ may be set such that $N_{max}/L$ is no greater than the maximum number of test packets that are transmitted before the sequence number exceeds its maximum value.

Figure 4:
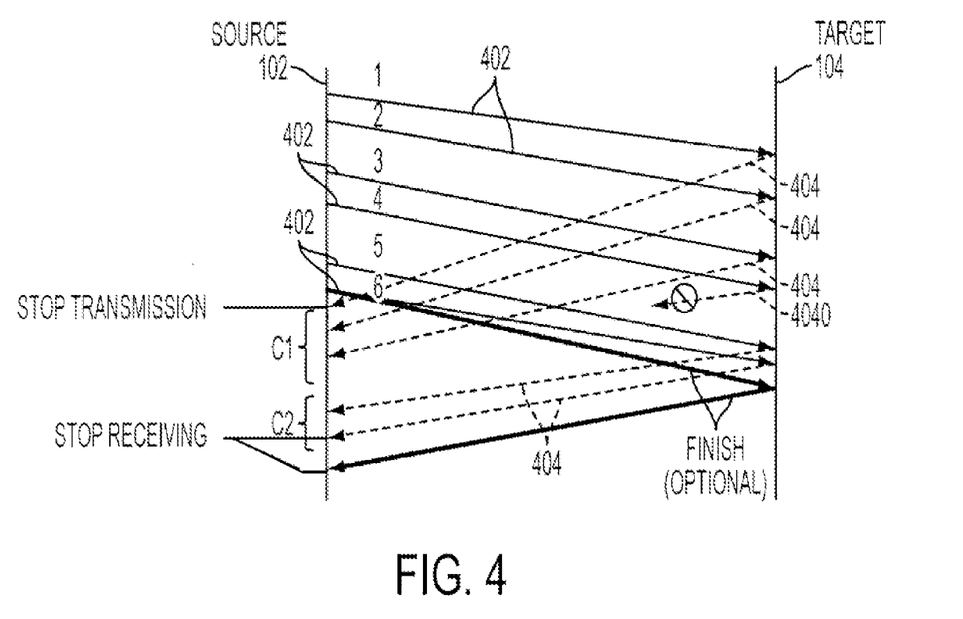
FIG. 4 illustrates an example single burst sequence diagram to measure roundtrip path available bandwidth according to the disclosed embodiments.

FIG. 4 depicts an example single burst sequence diagram 400 to measure roundtrip path available bandwidth according to the disclosed embodiments. In this case, echo packets, as shown by lines 402, and echo-reply packets, as shown by lines 404, are used as the test packets and test receipt packets, respectively. Echo and echo-reply messages are of size L. Source node 102 transmits at least $N_{min}$ octets of echo messages 402 (in the rate of $R_t$) and stops transmission when an echo-reply message 404 is received after transmitting $N_{min}$ octets or when transmitting $N_{max}$ octets.

In calculation of the available bandwidth, source node 102 uses the arrival times of echo messages 402 as the delivery times of test packets. In FIG. 4, 4-th echo-reply message 4040 is lost, creating two packet clusters $c_1=\{p_1,p_2,p_3\}$ and $c_2=\{p_5, p_6\}$. Thus, these packet clusters may be used in determining the available bandwidth using the single burst method, as disclosed above.

In another embodiment of the roundtrip path available bandwidth test, source node 102 may first check whether target node 104 supports the single burst method before transmission of echo messages with non-zero sequence numbers, by transmitting one or more reachability test packets and waiting for a reachability test receipt packet returned from the target node in response to the reachability test message. In this case, an echo or data message with a zero (0) sequence number is used as the reachability test packet and an echo-reply or data-ACK message with a zero (0) sequence number is used as the reachability test receipt packet, respectively.

The reachability test and reachability test receipt packets are not used for forming packet clusters. A reachability test packet may contain a null payload.

In another embodiment of the roundtrip path available bandwidth test, after transmission of the last test packet, source node 102 may transmit a Finish message as an explicit completion indication packet and target node 104 may return a Finish message as an explicit completion indication receipt packet in response to the Finish message received from source node 102.

Figure 5:
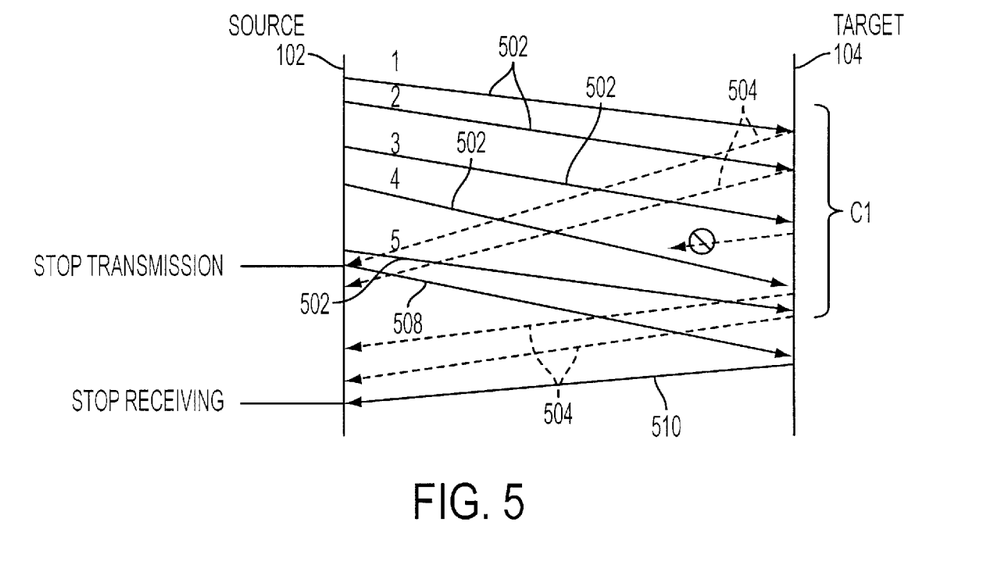
FIG. 5 illustrates an example single burst sequence diagram to measure forward path available bandwidth according to the disclosed embodiments.

FIG. 5 depicts an example single burst sequence diagram 500 to measure forward path available bandwidth according to the disclosed embodiments. In this case, data messages 502 and data-ACK messages 504 are used as the test packets and test receipt packets, respectively. Data messages 502 are of size L. Data-ACK messages 504 do not contain a payload. Source node 102 transmits at least $N_{min}$ octets of data messages 502, stops transmission when a data-ACK message 504 is received after transmitting $N_{min}$ octets or when transmitting $N_{max}$ octets, sends a finish message 508 and then waits for a report message 510. Target node 104 waits until finish message 508 is received and then returns report message 510.

In FIG. 5, 3rd data-ACK message 506 is lost. Target node 104 uses data messages 502 as test packets to calculate the available bandwidth, and there is only one packet cluster, designated as c1, formed, i.e., $c_1=\{p_1,p_2,p_3,p_4,p_5\}$. This packet cluster then may be used for determining the available bandwidth.

In another embodiment of the forward path available bandwidth test, source node 102 may first check whether target node 104 supports the single burst method before transmission of data messages with non-zero sequence numbers, by transmitting one or more reachability test packets and waiting for a reachability test receipt packet returned from the target node in response to the reachability test message. In this case, an echo or data message with a zero (0) sequence number is used as the reachability test packet and an echo-reply or data-ACK message with a zero (0) sequence number is used as the reachability test receipt packet, respectively.

The reachability test and reachability test receipt packets are not used for forming packet clusters. A reachability test packet may contain a null payload.

In another embodiment of the forward path available bandwidth test, source node 102 may first check whether target node 104 supports the single burst method before transmission of data messages with non-zero sequence numbers, by transmitting one or more data messages with a zero (0) sequence number to target node 104 and waiting for a data-ACK message with the zero (0) sequence number returned from target node 104 in response to the data message with the zero (0) sequence number.

In another embodiment of the forward path available bandwidth test, target node 104 may selectively return, or transmit, a data-ACK message instead of returning a data-ACK message for every data message. For example, target node 104 may transmit a data-ACK message for every 10 data messages, and sending node 102 receives the data-ACK message accordingly.

The data and data-ACK messages with the zero (0) sequence number are not used for forming packet clusters. The data messages with the zero (0) sequence number may contain a null payload.

Figure 6:
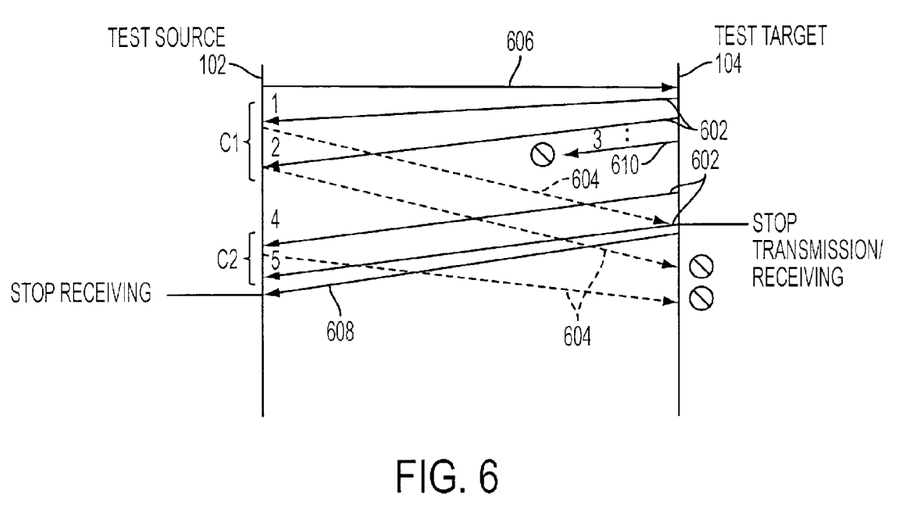
FIG. 6 illustrates an example single burst sequence diagram to measure backward path available bandwidth according to the disclosed embodiments.

FIG. 6 illustrates an example single burst sequence diagram 600 to measure backward path available bandwidth according to the disclosed embodiments. In this case, data messages 602 and data-ACK messages 604 are used as the test packets and test receipt packets, respectively. Data messages 602 are of size L. Data-ACK messages 604 do not contain a payload. Source node 102 transmits a start message 606 to initiate the test. Start message 606 may contain $R_t$ specified by source node 102. If start message 606 does not contain $R_t$, target node 104 will determine the value of $R_t$.

Target node 104 transmits at least $N_{min}$ octets of data messages 602 (in the rate of $R_t$), stops transmission when a data-ACK message 604 is received after transmitting $N_{min}$ octets or when transmitting $N_{max}$ octets, and then transmits a finish message 608. Source node 102 waits until finish message 608 is received. In FIG. 6, 3rd data message 610 is lost, thereby creating two packet clusters $c_1=\{p_1,p_2\}$ and $c_2=\{p_4, p_5\}$. These clusters then are used to determine the available bandwidth using the single burst method or algorithm disclosed above.

In another embodiment of the backward path available bandwidth test, target node 104 may first check whether source node 102 supports the single burst method before transmission of data messages with non-zero sequence numbers, by transmitting one or more reachability test packets and waiting for a reachability test receipt packet returned from target node 104 in response to the reachability test message. In this case, an echo or data message with a zero (0) sequence number is used as the reachability test packet and an echo-reply or data-ACK message with a zero (0) sequence number is used as the reachability test receipt packet, respectively.

The reachability test and reachability test receipt packets are not used for forming packet clusters. A reachability test packet may contain a null payload.

When echo and echo-reply messages with the zero (0) sequence number are used as reachability test and reachability test receipt packets, respectively, the messages may contain a randomly generated value in the payload to make sure that the sender of Start message is the same node as the sender of the reachability test receipt packet.

In another embodiment of the backward path available bandwidth test, source node 102 may selectively return, or transmit, a data-ACK message instead of returning a data-ACK message for every data message. For example, source node 102 may transmit a data-ACK message for every 10 data messages.

The following analysis may be made of the values and features of the single burst method or algorithm, especially in determining values for use in Equation 1 disclosed above. $B_r$, $B_f$ and $B_b$ denote the roundtrip path available bandwidth, the forward path available bandwidth and the backward path available bandwidth. B denotes $B_r$, $B_f$ or $B_b$ depending on the type of available bandwidth measurement being used ($B \leq R_t$). If the bottleneck link when measuring $B_r$ is sharing bandwidth between uplink and downlink and is included in both the forward and backward paths, the following relationship holds, as shown by Equation 2 below.

$$\min(B_f, B_b)/2 \leq B_r \leq \min(B_f, B_b). \qquad \text{[Equation 2]}$$

Otherwise, the following relationship holds, as shown by Equation 3 below.

$$B_r = \min(B_f, B_b) \qquad \text{[Equation 3]}$$

It may be noted that the bottleneck link when measuring $B_r$ and the bottleneck link when measuring $B_f$ or $B_b$ may be different.

$T_{rtt}$ denotes RTT of the first test packet and test receipt packet exchange (i.e., the first echo and echo-reply exchange with non-zero sequence numbers in the case of roundtrip path available bandwidth test and the first data and data-ACK exchange with non-zero sequence numbers in the case of directional available bandwidth test). N, $N_t$ and $N_r$ denote the total number of transmitted octets, the total number of octets for test packets and the total number of octets for test receipt packets, respectively.

The term $\lceil x \rceil$ denotes the floor function which returns the integer whose value is the smallest integer not less than x. In this analysis, the disclosed embodiments assume $N_{min} \leq N_t \leq N_{max}$ and $N_{max}/L$ is no greater than the maximum number of test packets that are transmitted before the sequence number exceeds its maximum value. $N_t$ is given as follows.

$$N_t = \lceil R_t T_{rtt}/8L \rceil L. \qquad \text{[Equation 4]}$$

The term D denotes the measurement latency in seconds. The following description derives N and D for each of three test types of single burst assuming that there is no packet loss or out-of-order packet. In this case, C=1 and therefore the available bandwidth is computed as follows.

$$B = 8(m_1-1)L/D_1. \qquad \text{[Equation 5]}$$

Because $m_1 = N_t/L$, $$D_1 = 8(N_t-L)/B. \qquad \text{[Equation 6]}$$

With regard to the roundtrip path available bandwidth test, only echo and echo-reply messages are used. Thus, $$N = N_t + N_r. \qquad \text{[Equation 7]}$$

Because echo and echo-reply messages have the same message length, $$N_r = N_t. \qquad \text{[Equation 8]}$$

Because $\lceil x \rceil < x+1$, Equations 6 and 7 lead to $$\begin{aligned} N &= 2\lceil R_t T_{rtt}/8L \rceil L < 2(R_t T_{rtt}/8L + 1)L \\ &= 2(R_t T_{rtt}/8 + L). \end{aligned} \qquad \text{[Equation 9]}$$

Thus, $$\begin{aligned} D &= T_{rtt} + D_1 \\ &= T_{rtt} + 8(N_t - L)/B \\ &= T_{rtt} + 8(\lceil R_t T_{rtt}/8L \rceil L - L)/B < T_{rtt} + \\ &\quad 8\{(R_t T_{rtt}/8L + 1)L - L\}/B \\ &= T_{rtt}(1 + R_t/B). \end{aligned} \qquad \text{[Equation 10]}$$

With regard to the forward path available bandwidth test, the following analysis may be shown. $L_A$, $L_S$ and $L_R$ denotes the length of data-ACK message, start message and report message including UDP and IP headers, respectively. Because data-ACK messages do not contain a payload, $$N_r = N_t L_A/L. \qquad \text{[Equation 11]}$$

Because start and report messages are used in addition to data and data-ACK messages, $$N = N_r + N_t + L_S + L_R. \qquad \text{[Equation 12]}$$

Thus, $$\begin{aligned} N &= \lceil R_t T_{rtt}/8L \rceil L(1 + L_A/L) + L_S + \\ &\quad L_R < (R_t T_{rtt}/8L + 1)L(1 + L_A/L) + L_S + L_R \\ &= R_t T_{rtt}(1 + L_A/L)/8 + L + L_A + L_S + L_R. \end{aligned} \qquad \text{[Equation 13]}$$

$T_D$, $T_A$ and $T_R$ denote the message delivery delay for the first data message and the report message, respectively. Because $T_{rtt}T_D+T_A$, $$D = T_D + D_1 + 8L_F/B + T_R \quad [\text{Equation 14}]$$
$$= T_{rtt} - T_A + 8(N_t - L)/B + 8L_F/B + T_R$$
$$= T_{rtt} + 8(\lceil R_t T_{rtt}/8L\rceil L - L)/B +$$
$$8L_F/B + T_R -$$
$$T_A < T_{rtt} + 8\{(R_t T_{rtt}/8L + 1)L - L\}/B +$$
$$8L_F/B + T_R - T_A$$
$$= T_{rtt}(1 + R_t/B) + 8L_F/B + T_R -$$
$$T_A < T_{rtt}(2 + R_t/B).$$

With regard to the backward path available bandwidth test, the following analysis may be shown. $L_F$ denotes the length of finish message including UDP and IP headers. Data-ACK messages do not contain a payload. Start and finish messages are used in addition to data and data-ACK messages. Thus, $$N_r = N_t L_A/L. \quad [\text{Equation 15}]$$

Using the relationships shown above, $$N = N_r + N_t + L_S + L_F \quad [\text{Equation 16}]$$
$$= \lceil R_t T_{rtt}/8L\rceil L(1 + L_A/L) + L_S +$$
$$L_F < (R_t T_{rtt}/8L + 1)L(1 + L_A/L) + L_S + L_F$$
$$= R_t T_{rtt}(1 + L_A/L)/8 + L + L_A + L_S + L_F.$$

Thus, $$D = T_S + T_D + D_1 + 8L_F/B \quad [\text{Equation 17}]$$
$$= T_S + T_D + 8(N_t - L)/B + 8L_F/B$$
$$= T_{rtt} + 8(\lceil R_t T_{rtt}/8L\rceil L - L)/B +$$
$$8L_F/B + T_S - T_A < T_{rtt} +$$
$$8\{(R_t T_{rtt}/8L + 1)L - L\}/B +$$
$$8L_F/B + T_S - T_A$$
$$= T_{rtt}(1 + Rt/B) + 8L_F/B + T_S -$$
$$T_A < T_{rtt}(2 + R_t/B).$$

Error! Reference source not found. Table 1 summarizes the mathematical analysis on the total number of transmitted octets and the measurement latency. In Table 1, $\overline{N}$ and $\overline{D}$ denote an upper bound of N and D, respectively.

TABLE 1

| | $\overline{N}$ | $\overline{D}$ |
|---|---|---|
| Roundtrip Path Test | $2(R_t T_{rtt}/8 + L)$ | $T_{rtt}(1 + R_t/B)$ |
| Forward Path Test | $R_t T_{rtt}(1 + L_A/L)/8 + L + L_A + L_S + L_R$ | $T_{rtt}(2 + R_t/B)$ |
| Backward Path Test | $R_t T_{rtt}(1 + L_A/L)/8 + L + L_A + L_S + L_F$ | $T_{rtt}(2 + R_t/B)$ |

Because $T_{rtt}$ is independent of $R_t$, the closer $R_t$ is to B, the less $\overline{N}$ and $\overline{D}$ are. The minimum values of $\overline{N}$ and $\overline{D}$ are given when $R_t$=B.

The disclosed embodiments also provide a single burst protocol (SBP) to perform the single burst method. SBP uses UDP as the transport protocol. A pair of source and target nodes is identified by the IP Source and Destination addresses and source and destination UDP port numbers. For measuring roundtrip path available bandwidth measurement, it is possible to use UDP port 7 (UDP Echo Protocol) to carry echo, echo-reply and Finish messages. For measuring roundtrip path available bandwidth without use of Finish message for explicit completion indication, it is also possible to use ICMP Echo since ICMP echo and echo reply messages carry the corresponding information contained in the single burst echo and echo-reply messages.

Figure 7:
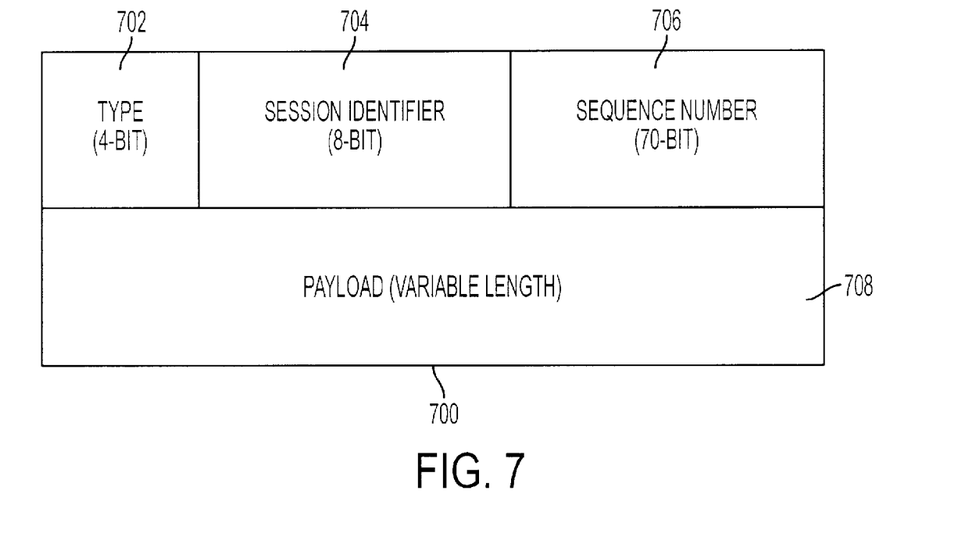
FIG. 7 illustrates a block diagram of a single burst protocol packet according to the disclosed embodiments.

An example format of an SBP packet 700 is illustrated in FIG. 7. All unsigned integer fields in the SBP header and payload are encoded as network-byte order. SBP message 700 includes of 4-octet header followed by a variable length payload. The header consists of 4-bit type field 702 followed by 8-bit session identifier field 704 followed by 20-bit unsigned integer sequence number field 706. The maximum value of $T_r$ (and therefore the maximum measurable available bandwidth) for $T_{rtt}$=5 (sec) and L=576 (octets) is given by $8(2^{20}-1)L/T_{rtt}$=966366720 (bps). The payload 708 may be null. The SBP packet size is known from the UDP header.

Type field 702 indicates the message type. Error! Reference source not found. Table 2 shows the message types.

TABLE 2

| Type | Message Name |
|---|---|
| 0x0 | Start |
| 0x1 | Finish |
| 0x2 | Report |
| 0x3 | Data |
| 0x4 | Data-ACK |
| 0x5 | Echo |
| 0x6 | Echo-Reply |

Session identifier field 704 is a random value assigned by the source node 102. The same session identifier is used throughout the same test run. Sequence number field 706 is set to zero (0) for start, finish and report messages. These messages may be retransmitted at most two times to be robust for packet loss. Data and echo messages have a sequence number starting from one (1). The corresponding data-ACK and echo-reply messages have the same sequence number as data and echo messages, respectively.

In some embodiments where echo (and echo-reply) and data (and data-ACK) messages with a zero (0) sequence number is used for checking whether the receiving node of echo and data messages supports the single burst method before transmission of echo and data messages with non-zero sequence numbers. Payload 708 is always empty for a finish message.

Figure 8:
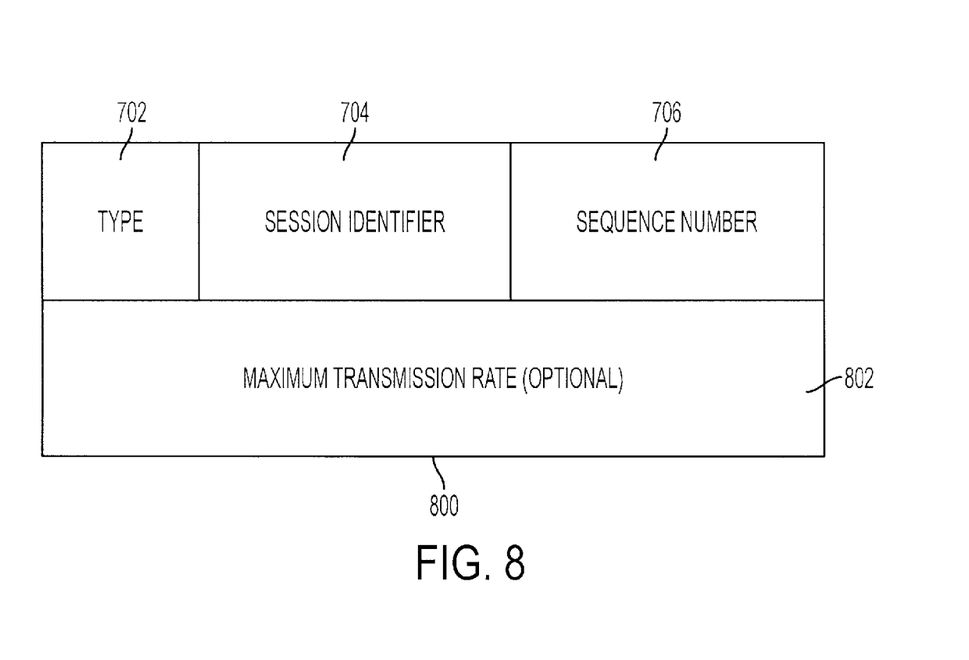
FIG. 8 illustrates a block diagram of a start message packet according to the disclosed embodiments.

FIG. 8 depicts a block diagram of a start message packet 800 according to the disclosed embodiments. The optional 4-octet maximum transmission rate field 802 contains a 32-bit unsigned integer containing the maximum transmission rate in Kbps requested by source node 102. The other fields act as disclosed above.

Figure 9:
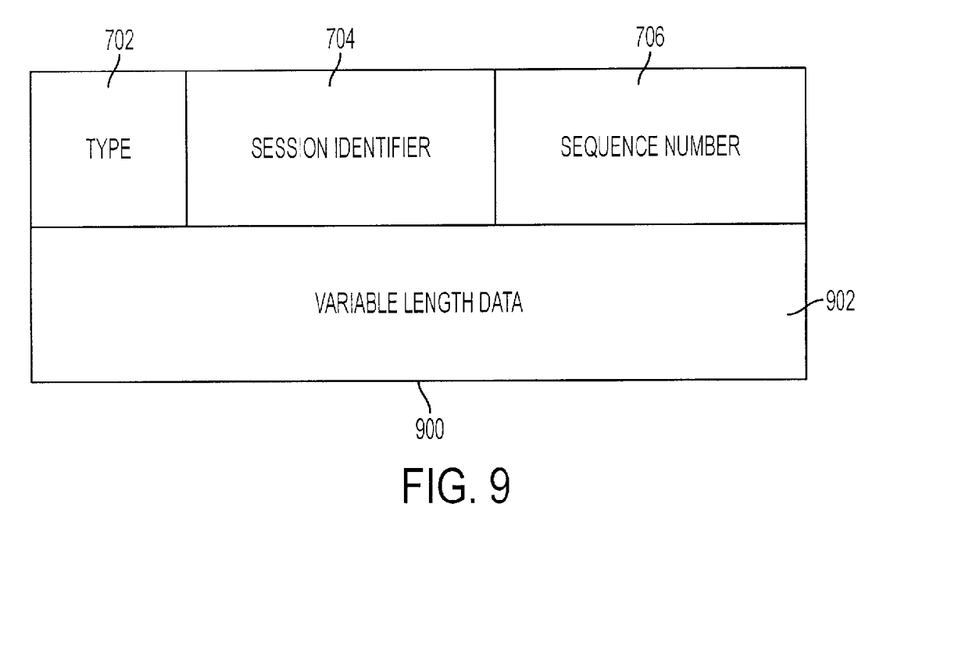
FIG. 9 illustrates a block diagram of a data message packet according to the disclosed embodiments.

FIG. 9 depicts a block diagram of a data message packet 900 according to the disclosed embodiments. Variable length data field 902 contains zero or more octets. The other fields act as disclosed above.

Figure 10:
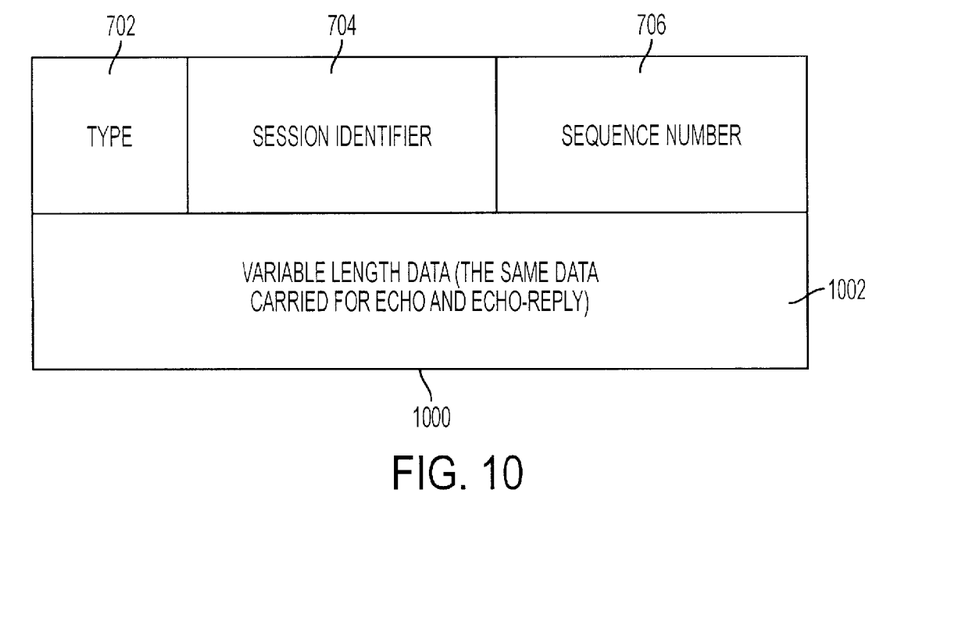
FIG. 10 illustrates a block diagram of an echo or echo-reply message packet according to the disclosed embodiments.

FIG. 10 depicts a block diagram of an echo or echo-reply message packet 1000 according to the disclosed embodiments. Variable length data field 1002 contains zero or more octets. Variable length data field 1002 of an echo-reply message must be copied from that of the corresponding echo message. The other fields act as disclosed above.

Figure 11:
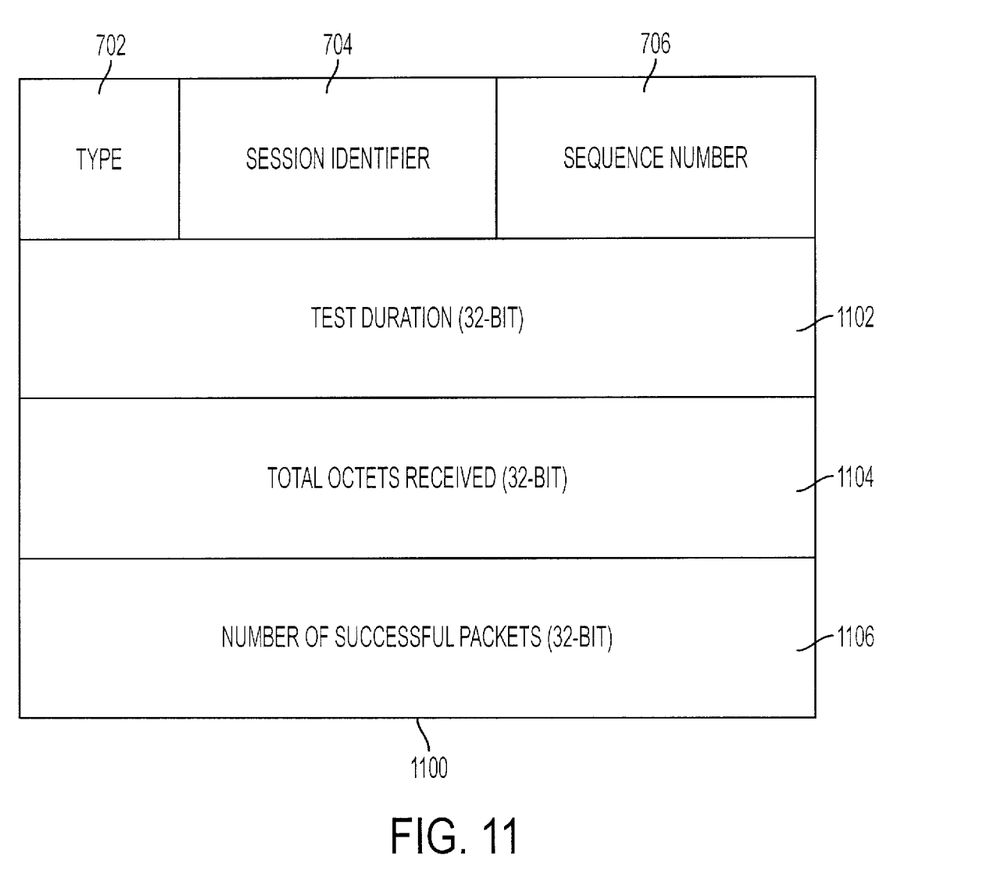
FIG. 11 illustrates a block diagram of a report message packet according to the disclosed embodiments.

FIG. 11 depicts a block diagram of a report message packet 1100 according to the disclosed embodiments. Test duration field 1102 is a 32-bit unsigned integer containing the maximum test duration in seconds. Total octets received field 1104 is a 32-bit unsigned integer containing the total number of octets received. Number of successful packets 1106 is a 32-bit unsigned integer containing the number of successfully delivered test packets.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A method for determining available bandwidth in a network environment, the method comprising:
    transmitting a plurality of test packets from a sending node, wherein each test packet includes a sequence number;
    receiving at the sending node a plurality of test receipt packets corresponding to the plurality of transmitted test packets from the sending node, wherein each test receipt packet includes the sequence number of the corresponding test packet;
    for forward path available bandwidth determination, forming one packet cluster from the plurality of the test packets transmitted from the sending node if all of the test packets transmitted from the sending node are received at a target node and if one or more of the test packets are not received at the target node, forming two or more packet clusters, each of which not containing the test packets that were not received by the target node;
    for backward path available bandwidth determination, transmitting a plurality of test packets from the target node and forming one packet cluster from the plurality of the test packets transmitted from the target node if all of the test packets transmitted from the target node are received at the sending node and if one or more of the test packets are not received at the sending node, forming two or more packet clusters, each of which not containing the test packets that were not received by the sending node;
    for round trip path available bandwidth determination, forming one packet cluster from the plurality of the test packets transmitted from the sending node if all of the corresponding test receipt packets are received at the sending node and if one or more of the corresponding test receipt packets are not received at the sending node, forming two or more packet clusters, each of which not containing the test packets for which the corresponding test receipt packets were not received by the sending node; and
    determining the forward path available bandwidth, the backward path available bandwidth and the round trip path available bandwidth based on the respective one or more of the formed packet cluster(s) and an inter-delivery time between a first test packet and a last test packet in said respective one or more of the formed packet cluster(s),
    wherein each packet cluster includes a set of delivery times of at least two test packets having sequence numbers that are continuous.

2. The method of claim 1, further comprising dynamically determining an amount of test packets to transmit.

3. The method of claim 2, wherein the amount is based on a round-trip time within the network environment.

4. The method of claim 1, wherein the determining step includes using a single burst algorithm to determine each available bandwidth.

5. The method of claim 1, further comprising discarding a test receipt packet.

6. The method of claim 1, further comprising setting a value for the determining step without user input.

7. The method of claim 1, wherein the forming step includes forming each packet cluster from an array of test packet delivery times.

8. The method of claim 1, wherein the determining step includes determining each available bandwidth using an equation $$B = \sum_{k=1}^{C} 8(m_k - 1)L \Big/ \sum_{k=1}^{C} D_k,$$

where $m_k$ denotes the number of test packets in k-th packet cluster ($m_k \geq 2$), $D_k$ denotes the inter-arrival time in seconds between the first and last test packets in k-th packet cluster, L denotes the size of the test packets, and C denotes the total number of packet clusters.

9. A method for determining available bandwidth in a network without a need for user input, the method comprising:
    dynamically determining an amount of test packets to transmit from a sending node, wherein each test packet includes a sequence number;
    transmitting a plurality of test packets corresponding to the determined amount of test packets from the sending node to a receiving node;
    receiving an amount of test receipt packets corresponding to the plurality of test packets from the receiving node, wherein each test receipt packet includes the sequence number of its corresponding test packet;
    setting a value for test packet size or transmission rate based on at least one network parameter;
    for forward path available bandwidth determination, forming one packet cluster from the plurality of the test packets transmitted from the sending node if all of the test packets transmitted from the sending node are received at a receiving node and if one or more of the test packets are not received at the receiving node, forming two or more packet clusters, each of which not containing the test packets that were not received by the receiving node;
    for backward path available bandwidth determination, transmitting a plurality of test packets from the receiving node and forming one packet cluster from the plurality of the test packets transmitted from the receiving node if all of the test packets transmitted from the receiving node are received at the sending node and if one or more of the test packets are not received at the sending node, forming two or more packet clusters, each of which not containing the test packets that were not received by the sending node;
    for round trip path available bandwidth determination, forming one packet cluster from the plurality of the test packets transmitted from the sending node if all of the corresponding test receipt packets are received at the sending node and if one or more of the corresponding test receipt packets are not received at the sending node, forming two or more packet clusters, each of which not containing the test packets for which the corresponding test receipt packets were not received by the sending node; and determining the forward path available bandwidth, the backward path available bandwidth and the round trip path available bandwidth based on the respective one or more of the formed packet cluster(s) and an inter-delivery time between a first test packet and a last test packet in said respective one or more of the formed packet cluster(s) in a single burst algorithm, wherein each packet cluster includes a set of delivery times of at least two test packets having sequence numbers that are continuous.

10. The method of claim 9, wherein the test packet comprises an echo packet, and the test receipt packet comprising an echo-reply packet.

11. The method of claim 9, wherein the determining step includes determining each available bandwidth using an equation for the single burst algorithm of $$B = \sum_{k=1}^{C} 8(m_k - 1)L \bigg/ \sum_{k=1}^{C} D_k,$$

where $m_k$ denotes the number of test packets in k-th packet cluster ($m_k \leq 2$), $D_k$ denotes the inter-arrival time in seconds between the first and last test packets in k-th packet cluster, L denotes the size of the test packets, and C denotes the total number of packet clusters.

12. A single burst method for determining available bandwidth in a network environment, the single burst method comprising:

transmitting a plurality of test packets each having a sequence number from a sending node to a receiving node;

receiving test receipt packets each having a sequence number corresponding to said sequence number at the sending node;

for forward path available bandwidth determination, forming one packet cluster from the plurality of the test packets transmitted from the sending node if all of the test packets transmitted from the sending node are received at a receiving node and if one or more of the test packets are not received at the receiving node, forming two or more packet clusters, each of which not containing the test packets that were not received by the receiving node;

for backward path available bandwidth determination, transmitting a plurality of test packets from the receiving node and forming one packet cluster from the plurality of the test packets transmitted from the receiving node if all of the test packets transmitted from the receiving node are received at the sending node and if one or more of the test packets are not received at the sending node, forming two or more packet clusters, each of which not containing the test packets that were not received by the sending node;

for round trip path available bandwidth determination, forming one packet cluster from the plurality of the test packets transmitted from the sending node if all of the corresponding test receipt packets are received at the sending node and if one or more of the corresponding test receipt packets are not received at the sending node, forming two or more packet clusters, each of which not containing the test packets for which the corresponding test receipt packets were not received by the sending node; and determining the forward path available bandwidth, the backward path available bandwidth and the round trip path available bandwidth based on the respective one or more of the formed packet cluster(s) and an inter-delivery time between a first test packet and a last test packet in said respective one or more of the formed packet cluster(s) in a single burst algorithm, wherein each packet cluster includes a set of delivery times of at least two test packets having sequence numbers that are continuous.

13. The single burst method of claim 12, further comprising dynamically determining a size of the test packet.

14. The single burst method of claim 12, further comprising forming the test packet according to a single burst protocol.

15. The single burst method of claim 12, further comprising changing a state of the test packet to place it in the packet cluster.

16. The method of claim 1, wherein the forming step includes executing a packet cluster algorithm at a source node of the plurality of test packets.

17. The method of claim 1, wherein the forming step includes executing a packet cluster algorithm at a target node of the plurality of test packets.

18. The method of claim 1, wherein the determining step is considered a failure if the transmitting step or the receiving step is not completed within a period of time.

19. The method of claim 1, further comprising using a user datagram protocol (UDP) as a single burst protocol to perform the method.

20. The method of claim 19, wherein a UDP Echo is used for the single burst protocol.

21. The method of claim 1, further comprising using internet control message protocol echo and echo-reply messages for transporting information corresponding to echo and echo-reply messages of a single burst protocol for determining each available bandwidth.

22. The method of claim 1, further comprising checking whether a peer node is reachable by the plurality of test packets or whether the peer node supports the plurality of test packets by sending a reachability test packet to the peer node.

23. The method of claim 22, further comprising receiving a reachability test receipt packet sent by the peer node in response to the reachability test packet.

24. The method of claim 23, wherein the reachability test packet and the reachability test receipt packet includes a random value.

25. The method of claim 1, wherein the receiving step includes selectively receiving the plurality of test receipt packets such that the number of test receipt packets is less than the number of test packets.

26. The method of claim 1, further comprising selectively transmitting the plurality of test receipt packets such that the number of test receipt packets is less than the number of test packets.

* * * * *